(12) United States Patent
Gessel et al.

(10) Patent No.: US 10,159,188 B2
(45) Date of Patent: Dec. 25, 2018

(54) CORN HARVESTER WITH TALL CORN ATTACHMENT AND ASSOCIATED METHODS

(71) Applicant: CNH Industrial America LLC, New Holland, PA (US)

(72) Inventors: James Michael Gessel, Geneseo, IL (US); Eric L. Walker, Narvon, PA (US); Michael Lee Berggren, Davenport, IA (US); Brian Patrick Crow, Rock Island, IL (US)

(73) Assignee: CNH Industrial America LLC, New Holland, PA (US)

( * ) Notice: Subject to any disclaimer, the term of this patent is extended or adjusted under 35 U.S.C. 154(b) by 100 days.

(21) Appl. No.: 15/249,321

(22) Filed: Aug. 26, 2016

(65) Prior Publication Data

US 2018/0054971 A1 Mar. 1, 2018

(51) Int. Cl.
*A01D 63/04* (2006.01)
*A01D 45/02* (2006.01)

(52) U.S. Cl.
CPC ........... *A01D 63/04* (2013.01); *A01D 45/021* (2013.01)

(58) Field of Classification Search
CPC ...... A01D 45/021; A01D 63/04; A01D 63/02; A01D 45/02; A01D 57/22; A01D 63/00; A01D 65/00; A01D 65/02
See application file for complete search history.

(56) References Cited

U.S. PATENT DOCUMENTS

| | | | |
|---|---|---|---|
| 771,354 A | 10/1904 | Danciger | |
| 925,863 A | 6/1909 | Braun | |
| 1,033,088 A | 7/1912 | Downing | |
| 1,172,033 A | 2/1916 | Mueller | |
| 1,219,327 A * | 3/1917 | Keeler | A01D 45/021 56/106 |
| 1,306,317 A * | 6/1919 | John | A01D 45/021 56/111 |
| 1,380,389 A | 6/1921 | Kile | |
| 1,846,453 A | 2/1932 | Pearson | |
| 1,859,208 A | 5/1932 | Kane | |
| 2,133,905 A * | 10/1938 | Rund, Jr. | A01D 65/02 172/517 |
| 2,648,944 A | 8/1953 | Powers | |
| 2,751,744 A * | 6/1956 | Reade | A01D 45/021 56/119 |
| 3,135,083 A | 6/1964 | Czajkowski | |
| 3,331,196 A * | 7/1967 | Grant | A01D 45/021 56/106 |

(Continued)

*Primary Examiner* — Arpad Fabian-Kovacs
(74) *Attorney, Agent, or Firm* — Peter K. Zacharias; Patrick M. Sheldrake

(57) ABSTRACT

A corn harvester that includes a corn head including a plurality of dividers. Each divider includes a top surface, first and second side surfaces, a proximal end and a distal end. One of the first or second side surfaces includes a recessed area formed therein. The corn harvester includes a tall corn attachment mounted to the hood and configured to be positioned in a stored position or a working position. In the stored position, the tall corn attachment is received within the recessed area of the hood. In the working position, the tall corn attachment extends from the top surface of the hood. The tall corn attachment includes a latching mechanism for locking the tall corn attachment in the stored position or the working position.

20 Claims, 20 Drawing Sheets

(56) References Cited

U.S. PATENT DOCUMENTS

| | | |
|---|---|---|
| 3,736,734 A | 6/1973 | Pavel |
| 4,037,393 A | 7/1977 | Anderson |
| 4,300,335 A | 11/1981 | Anderson |
| 4,346,548 A * | 8/1982 | Atkinson ............ A01D 45/021 56/119 |
| 4,377,062 A | 3/1983 | Slattery |
| 4,385,484 A | 5/1983 | Ehrhart et al. |
| 5,444,968 A * | 8/1995 | Barton ............... A01D 45/021 56/119 |
| 5,761,893 A | 6/1998 | Lofquist et al. |
| 5,775,076 A | 7/1998 | Mossman |
| 5,865,019 A | 2/1999 | Hurlburt et al. |
| 6,901,730 B1 * | 6/2005 | Buresch ............... A01D 63/04 56/314 |
| 7,681,387 B2 | 3/2010 | Guldenpfennig et al. |
| 7,752,829 B1 * | 7/2010 | Rottinghaus ......... A01D 45/021 56/110 |
| 8,726,623 B2 | 5/2014 | Kiel et al. |
| 9,603,304 B2 * | 3/2017 | Lambertini .......... A01D 45/021 |
| 2004/0107685 A1 * | 6/2004 | Resing ................ A01D 63/02 56/119 |
| 2004/0231309 A1 * | 11/2004 | Rickert ................ A01D 63/02 56/119 |
| 2005/0126151 A1 | 6/2005 | Buresch et al. |
| 2011/0028193 A1 * | 2/2011 | Murray ............. A01D 41/1243 460/111 |
| 2011/0277436 A1 * | 11/2011 | Allochis ............... A01D 63/02 56/109 |
| 2014/0150394 A1 * | 6/2014 | Calmer ............... A01D 45/021 56/106 |
| 2015/0121831 A1 * | 5/2015 | Noll .................... A01D 63/04 56/249 |
| 2016/0324072 A1 * | 11/2016 | Long ................... A01D 45/021 |
| 2017/0049056 A1 * | 2/2017 | Wenger ................ A01D 57/06 |

* cited by examiner

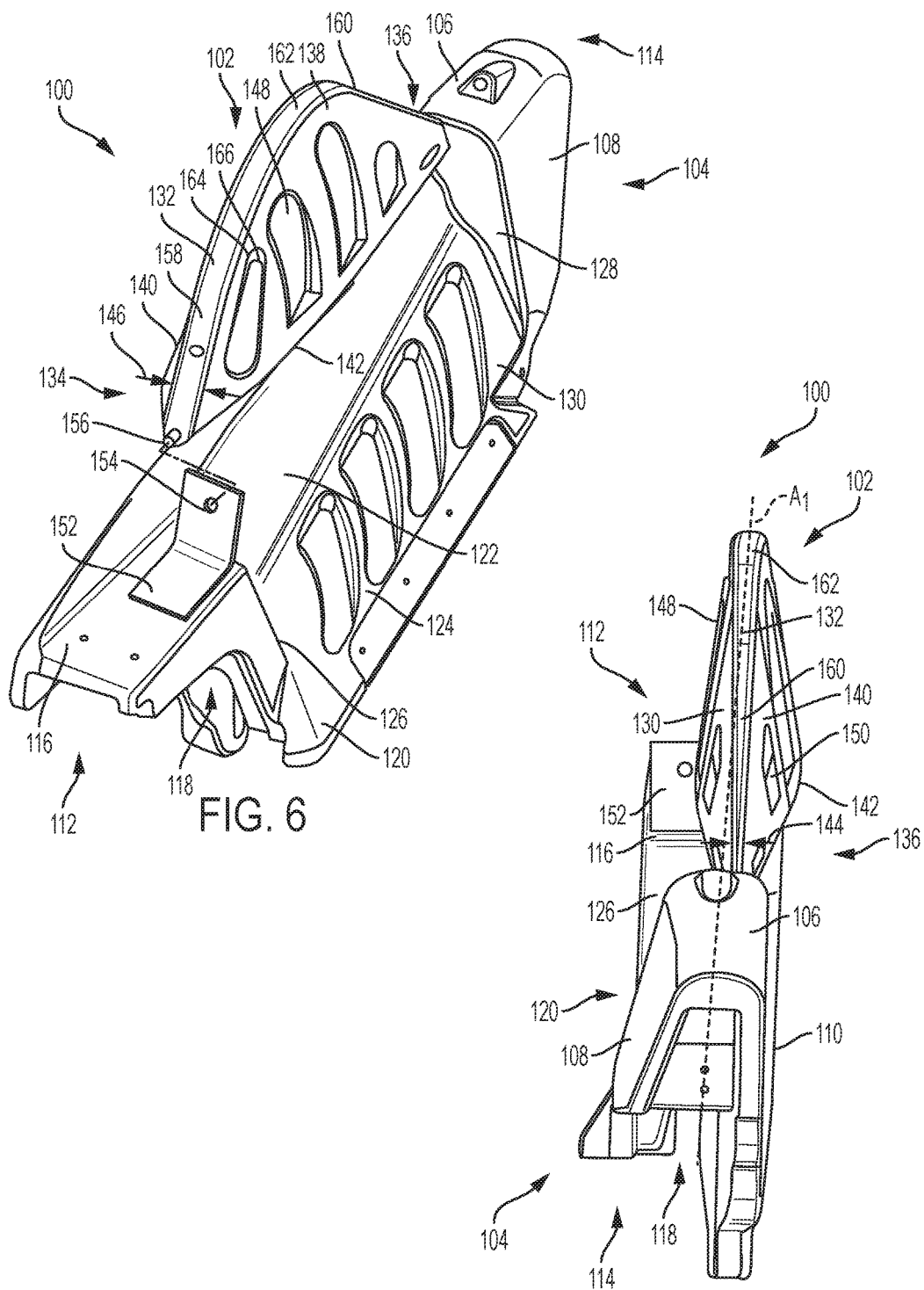

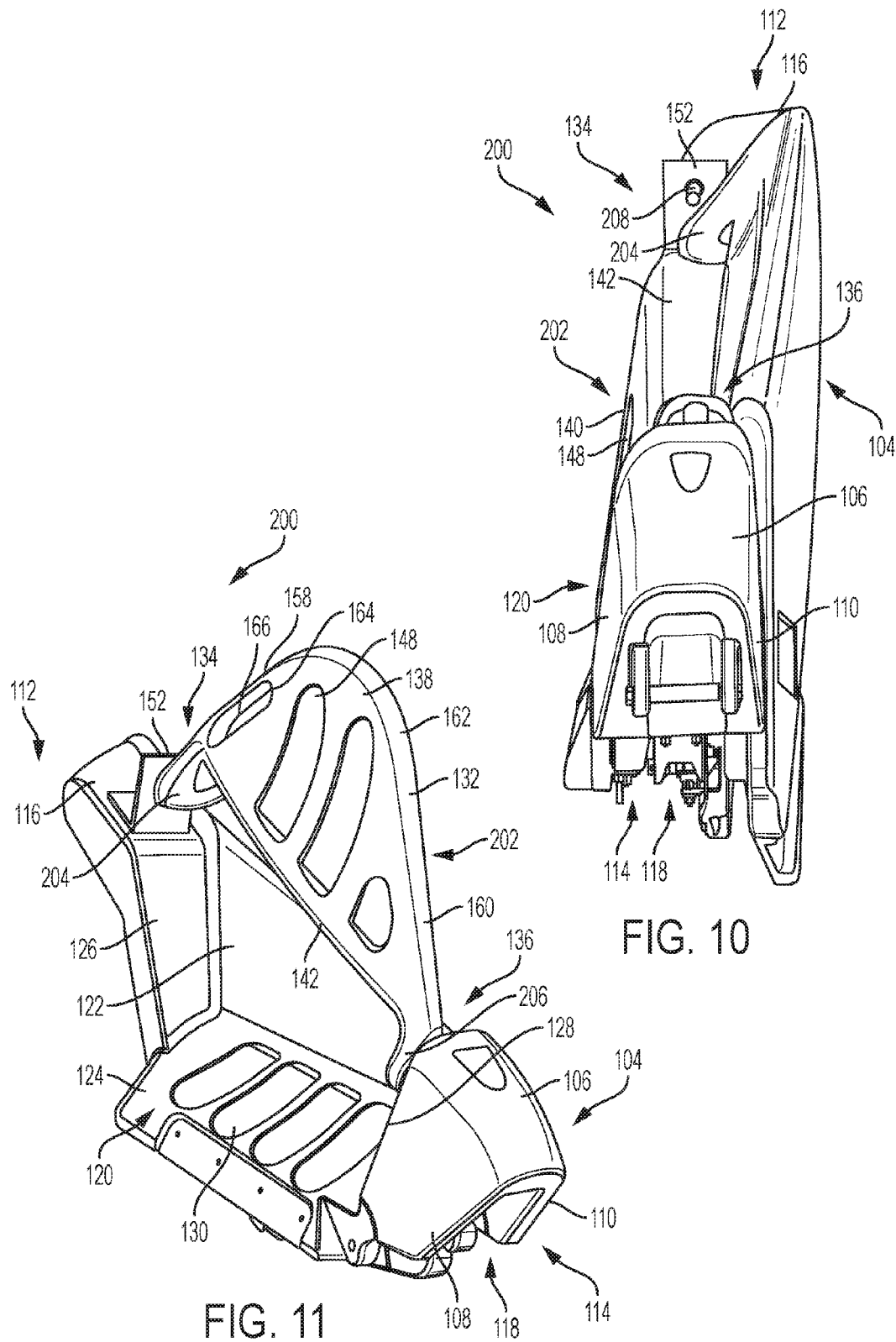

CORN HARVESTER WITH TALL CORN ATTACHMENT AND ASSOCIATED METHODS

BACKGROUND

Harvesters are used in the agricultural industry to harvest a variety of crops, including corn. Corn harvesters generally include a corn head with dividers and collection mechanisms configured to collect corn from the field. For example, FIG. 1 shows a traditional corn harvester 10 including a corn head 12 with a plurality of dividers 14. The corn harvester 10 can include a transverse auger 16 disposed behind the dividers 14. Attachments can be mounted to the divider to assist in guiding tall corn stalks into the collection mechanism.

Mounting an attachment to the divider can be time-consuming due to the necessity of bolting multiple components to the divider. Therefore, a significant amount of labor is necessary to secure and remove the attachment when harvesting corn stalks of different heights.

SUMMARY

Exemplary embodiments are directed to corn harvesters including a tall corn attachment mounted to a divider of a corn head. The tall corn attachment is rotatably mounted to the divider such that the tall corn attachment can be rotated between a stored position (e.g., when harvesting short corn stalks) and a working position (e.g., when the tall corn attachment is being used) without the necessity of repeatedly bolting and unbolting multiple components to the divider. Thus, the tall corn attachment can be conveniently and efficiently positioned between a working and non-working position depending on the needs of the user.

In accordance with embodiments of the present disclosure, an exemplary corn harvester is provided. The corn harvester includes a corn head including a plurality of dividers. Each divider includes a hood with a top surface, first and second side surfaces, a proximal end and a distal end. One of the first or second side surfaces includes a recessed area formed therein. The corn harvester includes a tall corn attachment mounted to the hood and configured to be positioned in a stored position or a working position. In the stored position, the tall corn attachment is received within the recessed area of the hood. In the working position, the tall corn attachment extends from the top surface of the hood. The tall corn attachment can include a latching mechanism for locking the tall corn attachment in the stored position or the working position.

The recessed area of the hood can be substantially complementary to the configuration of the tall corn attachment. The recessed area of the hood includes a planar side wall offset from a central longitudinal axis of the hood and extending between the proximal and distal ends of the hood, and a front planar wall located near the distal end of the hood. In the working position, the tall corn attachment can be substantially aligned with the central longitudinal axis of the hood.

The corn harvester can include a support flange mounted on the hood and located near the proximal end of the hood. The support flange can include an aperture formed therein. The latching mechanism can include a pivot pin extending from a distal end of the tall corn attachment and a pin (e.g., a spring-loaded pin, a manually actuated pin, or the like) extending from a proximal end of the tall corn attachment. The pivot pin extending from the distal end of the tall corn attachment can be configured to be received in an aperture formed in the front planar wall of the recessed area of the hood to define a distal pivot point. The pin extending from the proximal end of the tall corn attachment can be configured to be received in the aperture of the support flange to define a proximal pivot point. The distal and proximal pivot points extend along a pivot axis of the tall corn attachment.

In some embodiments, the tall corn attachment can be detachably mounted to the hood. The tall corn attachment includes a leading edge extending between a proximal end and a distal end of the tall corn attachment, a base, and first and second side surfaces. In some embodiments, the leading edge defines a curved surface tapering from a first width at the distal end to a second width at the proximal end, the first width being dimensioned greater than the second width. Each of the first and second side surfaces can taper outwardly from the leading edge to the base. In some embodiments, each of the first and second side surfaces can include one or more indented louvers formed therein.

A proximal end of the tall corn attachment can be rotatably mounted to the support flange of the hood in a non-detachable manner, and the distal end of the tall corn attachment can be rotatably mounted to the front planar wall of the recessed area of the hood in a non-detachable manner. The tall corn attachment includes a pivot axis extending parallel and offset from a bottom surface of the tall corn attachment. The tall corn attachment further includes a proximal leading edge portion and a distal leading edge portion connected by a rounded leading edge top portion. The proximal leading edge portion and the distal leading edge portion can extend at angles relative to the pivot axis. The angle of the proximal. leading edge portion can be greater than the angle of the distal leading edge portion. In some embodiments, the tall corn attachment can include a slot or groove formed offset from and extending parallel to the proximal leading edge. The groove can be configured and dimensioned to receive at least a portion of a hand of a user.

In accordance with embodiments of the present disclosure, an exemplary corn harvester divider is provided. The corn harvester divider includes a hood with a top surface, first and second side surfaces, a proximal end and a distal end. One of the first or second side surfaces includes a recessed area formed therein. The corn harvester divider includes a tall corn attachment mounted to the hood and configured to be positioned in a stored position or a working position. In the stored position, the tall corn attachment can be received within the recessed area of the hood. In the working position, the tall corn attachment can extend from the top surface of the hood. The tall corn attachment can include a latching mechanism for locking the tall corn attachment in the stored position or the working position.

In accordance with embodiments of the present disclosure, an exemplary method of operating a corn harvester is provided. The method includes providing a corn head including a plurality of dividers, each divider including a hood with a top surface, first and second side surfaces, a proximal end and a distal end. One of the first or second side surfaces includes a recessed area formed therein. The method includes mounting a tall corn attachment to the hood. The method includes positioning the tall corn attachment in a stored position. In the stored position, the tall corn attachment can be received within the recessed area of the hood.

The method includes positioning the tall corn attachment in a working position. In the working position, the tall corn attachment can extend from the top surface of the hood. The tall corn attachment can include a latching mechanism for locking the tall corn attachment in the stored position or the working position. The method can include detaching the tail corn attachment from the hood prior to positioning the tall corn attachment in the stored position. The method further includes rotating the tall corn attachment between the working position and the stored position along a pivot axis in a non-detachable manner relative to the hood.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed corn harvesters and associated system and methods, reference is made to the accompanying figures, wherein:

FIG. 6 is a rear, perspective view of an exemplary divider of FIG. 2 including a detachable tall corn attachment in a working position;

FIG. 7 is a front view of an exemplary divider of FIG. 2 including a detachable tall corn attachment in a working position;

FIG. 10 is a front view of an exemplary divider of FIG. 8 including a non-detachable tall corn attachment in a stored position;

FIG. 11 is a front, perspective view of an exemplary divider of FIG. 8 including a non-detachable tall corn attachment in a working position;

Figures 12, 13:
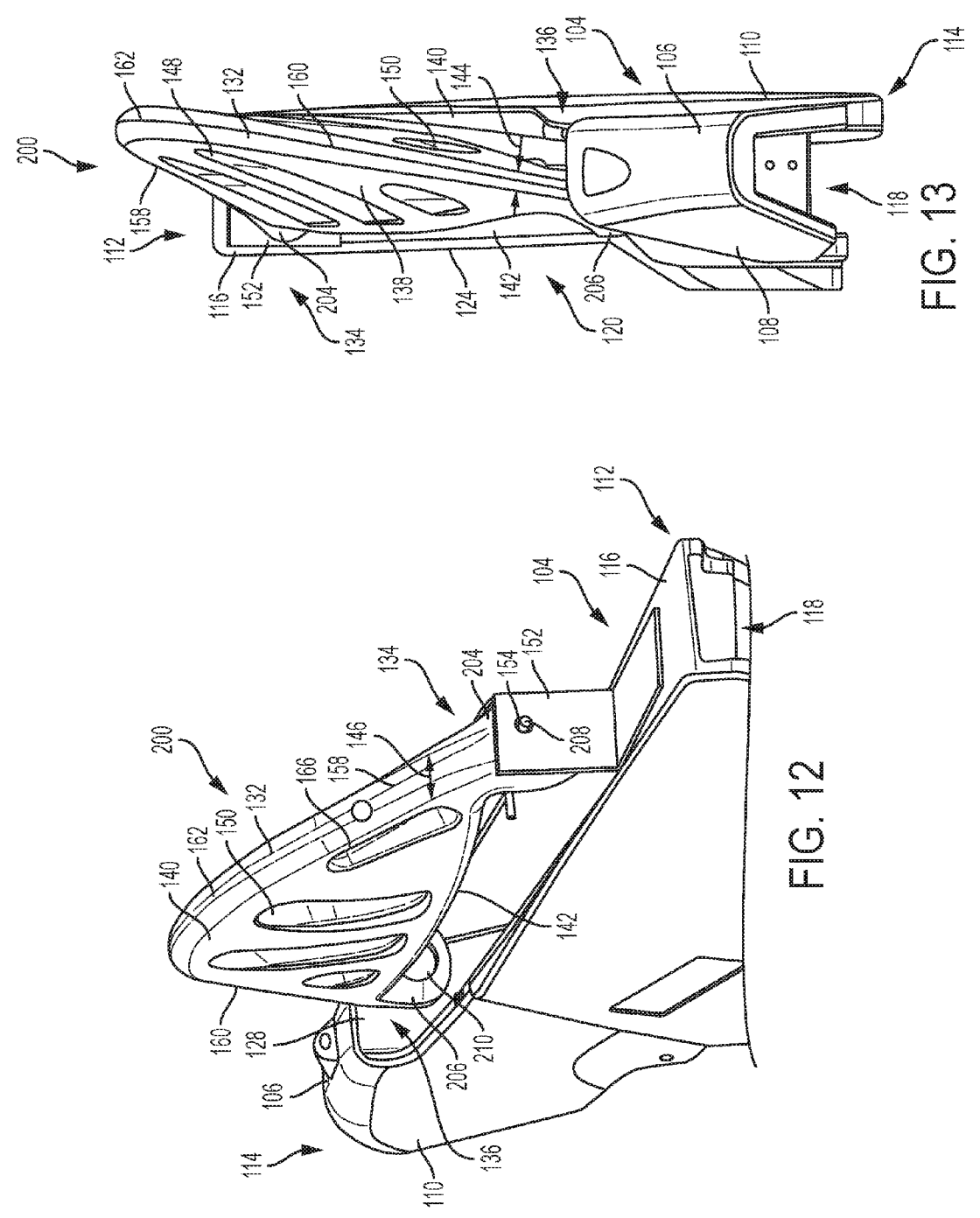

FIG. 12 is a rear, perspective view of an exemplary divider of FIG. 8 including a non-detachable tall corn attachment in a working position;

FIG. 13 is a front view of an exemplary divider of FIG. 8 including a non-detachable tall corn attachment in a working position;

DETAILED DESCRIPTION

It should be understood that the relative terminology used herein, such as "front", "rear", "left", "top", "bottom", "vertical", "horizontal", "up" and "down" is solely for the purposes of clarity and designation and is not intended to limit embodiments to a particular position and/or orientation. Accordingly, such relative terminology should not be construed to limit the scope of the present disclosure. In addition, it should be understood that the scope of the present disclosure is not limited to embodiments having specific dimensions. Thus, any dimensions provided herein are merely for an exemplary purpose and are not intended to limit the invention to embodiments having particular dimensions.

Figure 1:
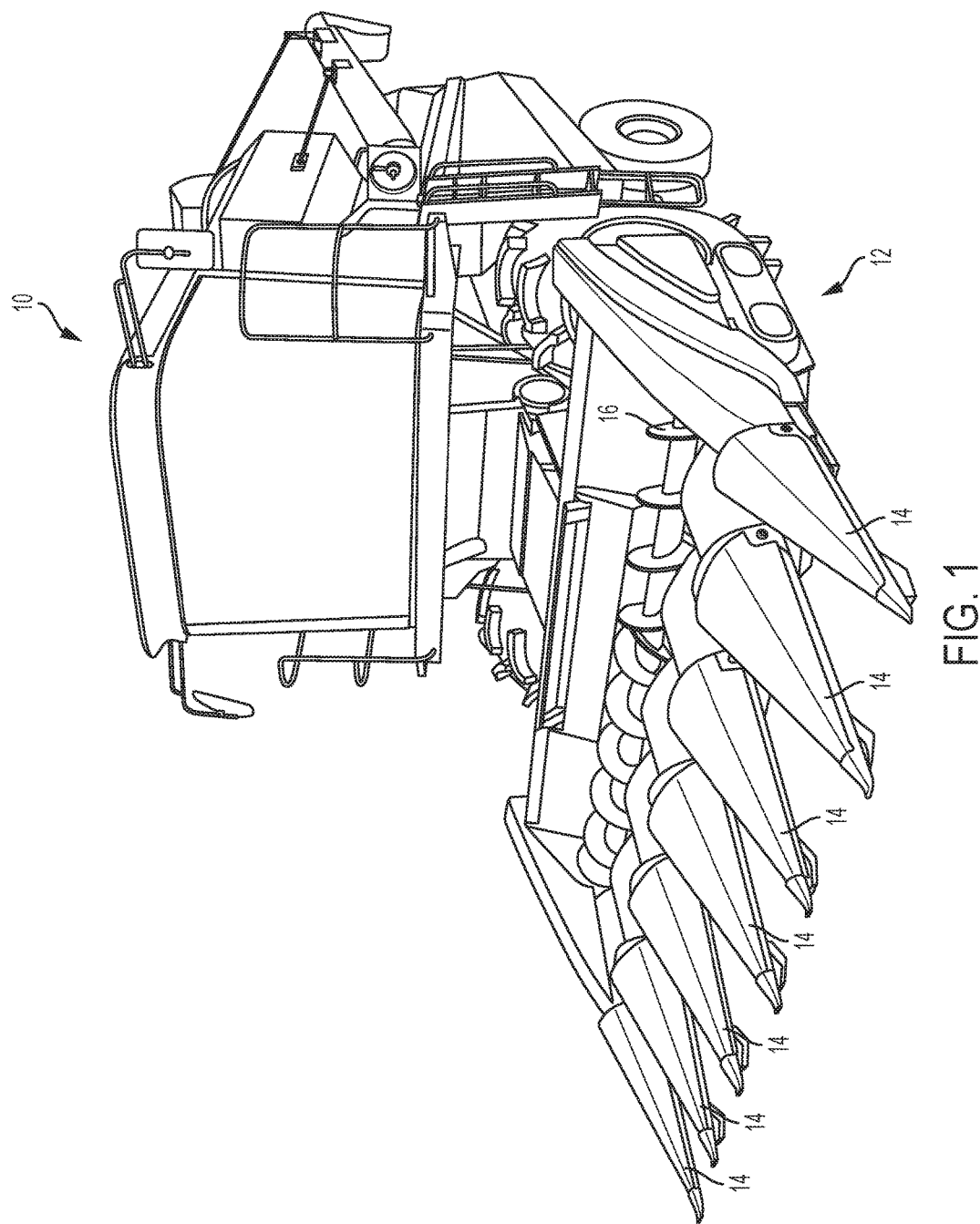
FIG. 1 is a perspective view of a traditional corn harvester.
Figure 2:
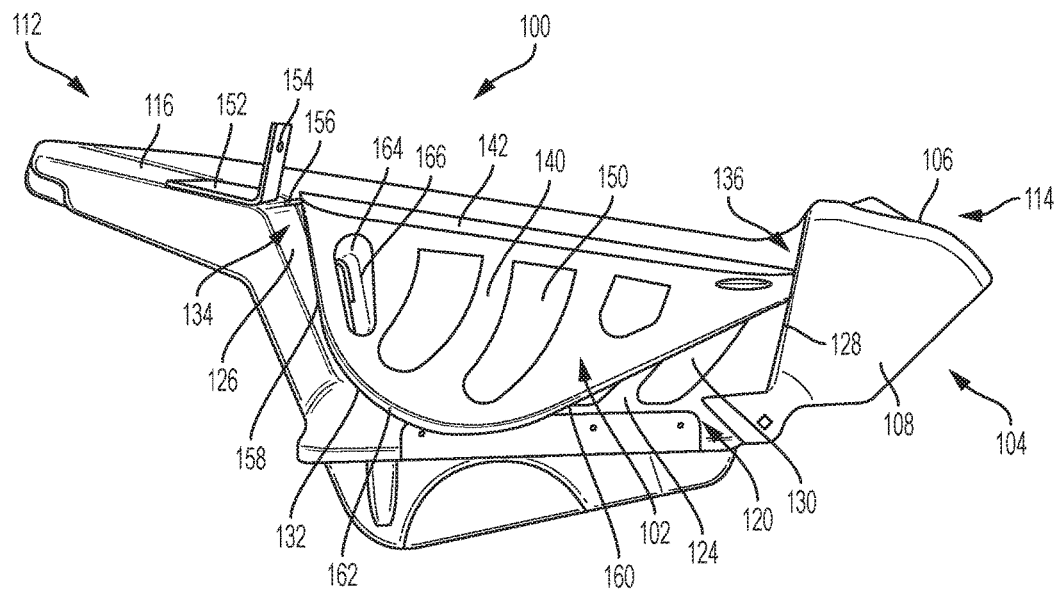
FIG. 2 is a side view of an exemplary divider of the present disclosure including a detachable tall corn attachment in a stored position.
Figure 3:
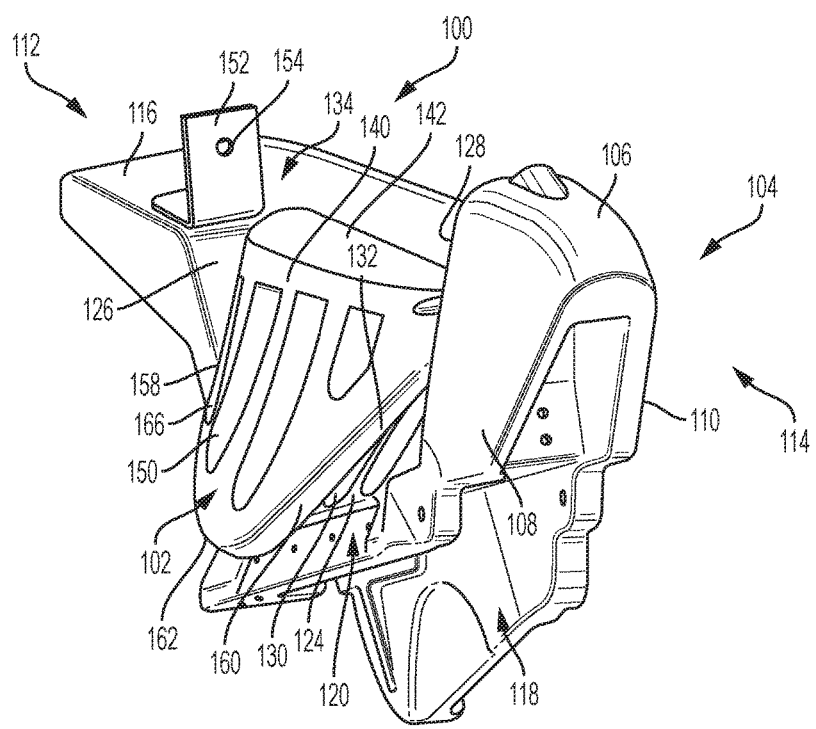
FIG. 3 is a front, perspective view of an exemplary divider of FIG. 2 including a detachable tall corn attachment in a stored position.
Figure 4:
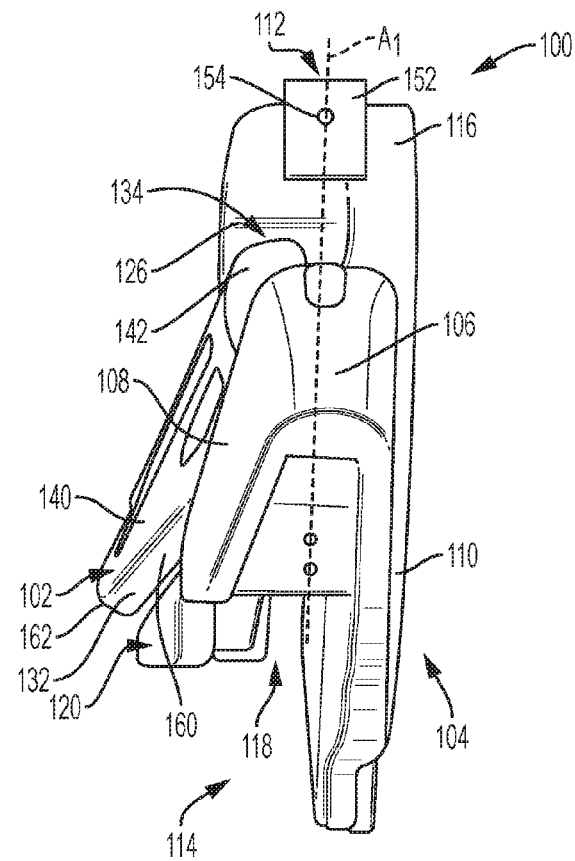
FIG. 4 is a front view of an exemplary divider of FIG. 2 including a detachable tall corn attachment in a stored position.
Figure 5:
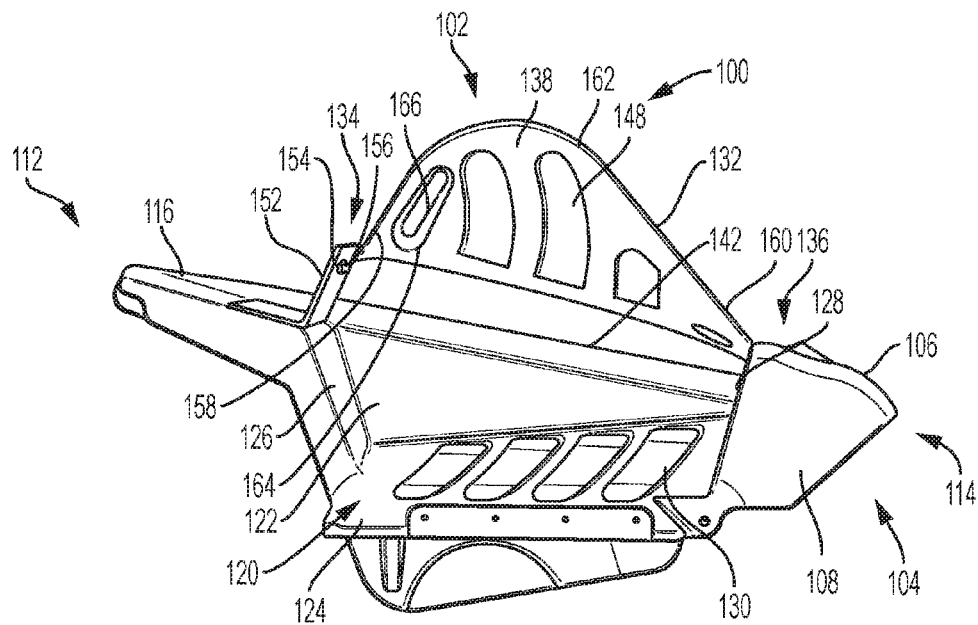
FIG. 5 is a side view of an exemplary divider of FIG. 2 including a detachable tall corn attachment in a working position.
Figure 8:
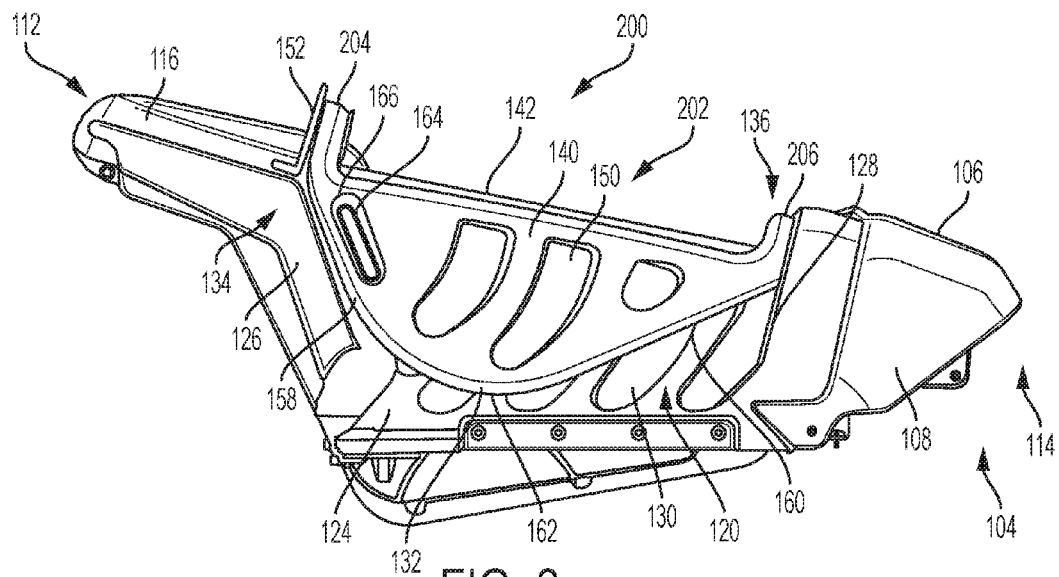
FIG. 8 is a side view of an exemplary divider of the present disclosure including a non-detachable tall corn attachment in a stored position.
Figure 9:
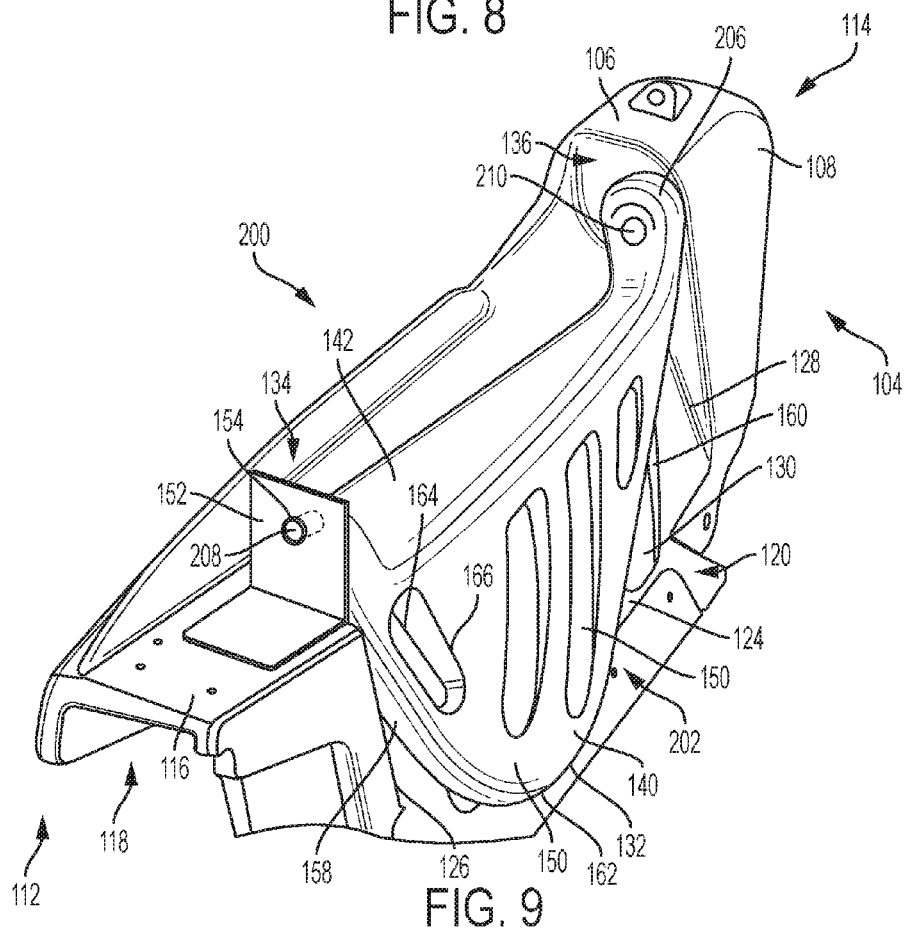
FIG. 9 is a rear, perspective view of an exemplary divider of FIG. 8 including a non-detachable tall corn attachment in a stored position.

FIGS. 2-7 show perspective, side and front views of an exemplary divider 100 including a detachable tall corn attachment 102. In particular, FIGS. 2-7 show the tall corn attachment 102 positioned in a stored position and a working position. It should be understood that the exemplary divider 100 can be incorporated into a traditional corn head (e.g., the corn head 10 shown in FIG. 1) to improve the corn harvesting process. In addition, the divider 100 can be incorporated into any traditional corn heads, such as corn heads that include a fender or hood extension for guiding ears of corn that can bounce over the divider, or corn heads that include a fender or hood configured to tilt upwards to provide access to the collection mechanism to repair blockages in the collection mechanism, such as the corn heads disclosed in U.S. Pat. Nos. 5,775,076 and 7,681,387, which are incorporated herein by reference.

The divider 100 generally includes a hood 104 that includes a distal top surface 106, a first side surface 108, a second side surface 110, a proximal end 112, a distal end 114, and a proximal top surface 116. The distal top surface 106 can define a rounded or curved configuration, while the proximal top surface 116 can define a substantially flat or planar configuration. In some embodiments, the first side surface 108 can be angled relative to a vertical plane, while the second side surface 110 can be substantially parallel to a vertical plane. The walls or surfaces of the divider 100 can define one or more hollow cavities 118 therebetween (e.g., on an inner, bottom surface) that includes features for mounting the divider 100 on the corn head.

The hood 104 includes a recessed area 120 formed in one of the first or second side surfaces 108, 110 (e.g., the first side surface 108 as shown in FIGS. 2-7). In particular, the recessed area 120 can extend between the distal and proximal top surfaces 106, 116. The configuration and dimensions of the recessed area 120 can be such that the recessed area 120 is substantially complementary to the tall corn attachment 102 and can at least partially receive the tall corn attachment 102 in the stored position. The recessed area 120 includes a planar inner side wall 122 that is offset from a central longitudinal axis $A_1$ (e.g., the recessed area 120 is not symmetrically formed in the hood 104). The planar inner side wall 122 can define a triangular configuration tapering from the proximal end 112 to the distal end 114.

The recessed area 120 further includes an angled lower surface 124 extending from the planar inner side wall 122, a rear planar wall 126 and a front planar wall 128. The rear planar wall 126, the lower surface 124 and the front planar wall 128 form a substantially U-shaped cavity with the rear planar wall 126 and the front planar wall 128 extending outwardly from the lower surface 124. The rear planar wall 126 transitions into the proximal top surface 116. In some embodiments, the lower surface 124 can include one or more louvers 130 formed therein. The louvers 130 are formed as indentations within the lower surface 124, and assist in guiding loose corn kernels into the collection mechanism of the harvester as the harvester moves along a field.

The tall corn attachment 102 generally includes a leading edge 132 defining a top, curved edge of the tall corn attachment 102. The leading edge 132 extends between a proximal end 134 and a distal end 136 of the tall corn attachment 102. The tall corn attachment 102 includes first and second side surfaces 138, 140 and a base 142 defining the bottom of the tall corn attachment 102. The leading edge 132 defines a curved surface that tapers from a first width 144 at the distal end 136 to a second width 146 at the proximal end 134.

In some embodiments, the first width 144 can be dimensioned greater than the second width 146. In some embodiments, as shown in FIGS. 6 and 7, the second width 146 can be dimensioned greater than the first width 144. In some embodiments, the distal end 136 of the tall corn attachment 102 (including the leading edge 132 and the first and second side surfaces 138, 140) can be dimensioned wider than the proximal end 134 of the tall corn attachment 102, the overall width tapering or narrowing in the direction of the proximal end 134. The wider configuration at the distal end 136 (e.g., a front end) of the tall corn attachment 102 provides a larger and stronger surface for engagement and taking down of large corn stalks.

The first and second side surfaces 138, 140 can taper outwardly from the leading edge 132 to the base 142 such that the base 142 defines a greater width than the leading edge 132. In some embodiments, the leading edge 132, first and second side surfaces 138, 140 and the base 142 can define a hollow inner chamber therebetween and the tapered configuration of the first and second side surfaces 138, 140 provides the structural stability for guiding corn stalks. In some embodiments, the first and second side surfaces 138, 140 can include louvers 148, 150 formed therein. The louvers 148, 150 can be formed as recessed sections in the first and second side surfaces 138, 140. Similar to the louvers 130, the louvers 148, 150 can be angled or curved in the direction of the proximal end 112 and assist in directing loose corn kernels into the collection mechanism of the harvester.

The tall corn attachment 102 includes a pivot axis extending substantially parallel to and offset from the bottom surface or base 142. The tall corn attachment 102 can pivot along the pivot axis between the stored position shown in FIGS. 2-4 and the working position shown in FIGS. 5-7. In particular, the distal end 136 of the tall corn attachment 102 can be mounted to the front planar wall 128 of the hood 104 via a latching mechanism (e.g., a spring-loaded pin, a pin extending from the distal end 136, or the like) such that the tall corn attachment 102 can be interlocked with the front planar wall 128 when in the working position, and disengaged from the front planar wall 128 when in the stored position. Specifically, the tall corn attachment 102 can be disengaged from the front planar wall 128 and detached from the hood 104 prior to placing the tall corn attachment 102 in the stored position. In the stored position, the tall corn attachment 102 can be received within the recessed area 120 of the hood 104. In the working position, the tall corn attachment 102 can extend from the top surface of the hood 104.

The divider 100 includes a mounting or support flange 152 mounted to the proximal top surface 116 adjacent to the rear planar wall 126. The support flange 152 includes an aperture 154 formed therein. The proximal end 134 of the tall corn attachment 102 includes a pin 156 (e.g., spring-loaded pin, manually actuated pin, or the like) extending therefrom. The pin 156 is configured to be received in and engages the aperture 154 of the support flange 152 such that that tall corn attachment 102 can be mounted to the divider 100 in the working position. The latching mechanism can be disengaged from the support flange 152 to detach the tall corn attachment 102 from the divider 100 and place the tall corn attachment 102 in the recessed area 120 for storage. In some embodiments, rather than including a support flange 152, the rear planar wall 126 can include an aperture and the proximal end 134 of the tall corn attachment 102 can be mounted to the rear planar wall 126 of the recessed area 120.

The leading edge 132 can be separated into a proximal leading edge portion 158, a distal leading edge portion 160, and a rounded, central leading edge top portion 162. The leading edge top portion 162 connects the proximal and distal leading edge portions 158, 160. The proximal and distal leading edge portions 158, 160 extend at angles relative to the pivot axis and the base 142. The angle of the proximal leading edge portion 158 can be greater than the angle of the distal leading edge portion 160, thereby defining a substantially triangular configuration with a rounded top portion 162.

In some embodiments, the tall corn attachment 102 can include a slot 164, 166 formed offset from and extending substantially parallel to the proximal leading edge portion 158. The slot 164, 166 can extend between the first and second side surfaces 138, 140, and can be configured and dimensioned to receive at least a portion of a hand of a user for manipulating the tall corn attachment 102 between the stored position and the working position. In some embodiments, the slot 164, 166 can be formed as a groove that partially extends into the respective first and second side surfaces 138, 140.

FIGS. 8-13 show side, perspective and front views of an alternative embodiment of a divider 200 according to the present disclosure. The divider 200 can be substantially similar in structure and function to the divider 100, except for the distinctions noted herein. Therefore, like reference numbers are used to represent like structures. In particular, rather than including a detachable tall corn attachment 102, the divider 200 includes a non-detachable tall corn attachment 202 configured to be mounted to the support flange 152 and the front planar wall 128 and positionable between a stored position shown in FIGS. 8-10 and a working position shown in FIGS. 11-13.

The divider 200 includes an L-shaped support flange 152 mounted to the proximal top surface 116 of the hood 104. The support flange 152 includes an aperture 154 that receives therethrough a pin or fastener 208. Rather than including a substantially linear bottom surface or base 142, the tall corn attachment 202 includes proximal and distal mounting flanges 204, 206 extending from the base 142. The mounting flanges 204, 206 can extend substantially perpendicularly from the base 142 and include an aperture configured and dimensioned to receive therethrough the pins or fasteners 208, 210.

In particular, the proximal mounting flange 204 includes an aperture dimensioned to receive therethrough the fastener 208, and the distal mounting flange 206 includes an aperture dimensioned to receive therethrough the fastener 210. A latching mechanism in the form of the fasteners 208, 210 (e.g., a spring-loaded pins, a manually actuated pins, or the like) can be used to engage the aperture 154 in the support flange 152 and an aperture in the front planar wall 128, respectively. With the tall corn attachment 202 mounted to the support flange 152 and the front planar wall 128, the tall corn attachment 202 can be rotated between the working and stored position.

Figure 14:
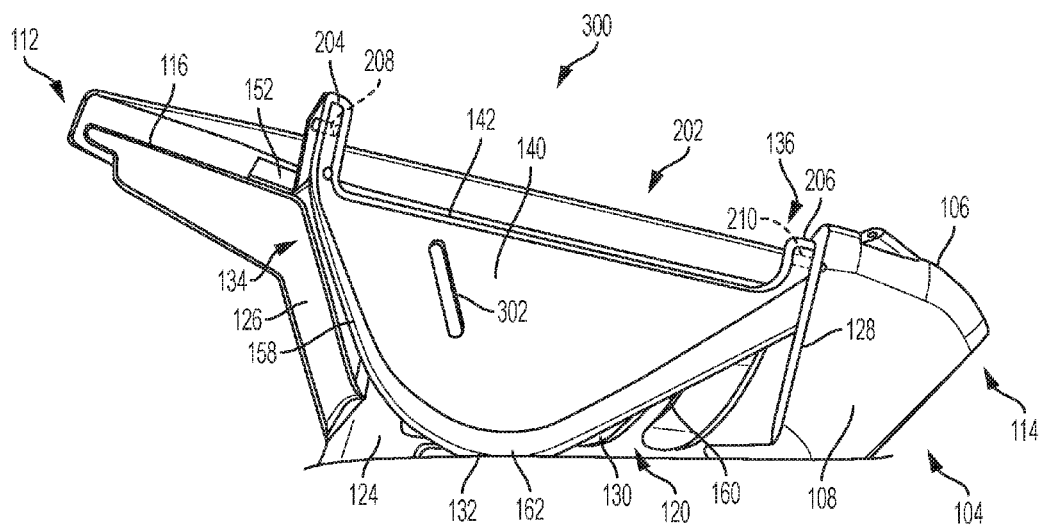
FIG. 14 is a side view of an exemplary divider of the present disclosure including a non-detachable tall corn attachment in a stored position.
Figure 15:
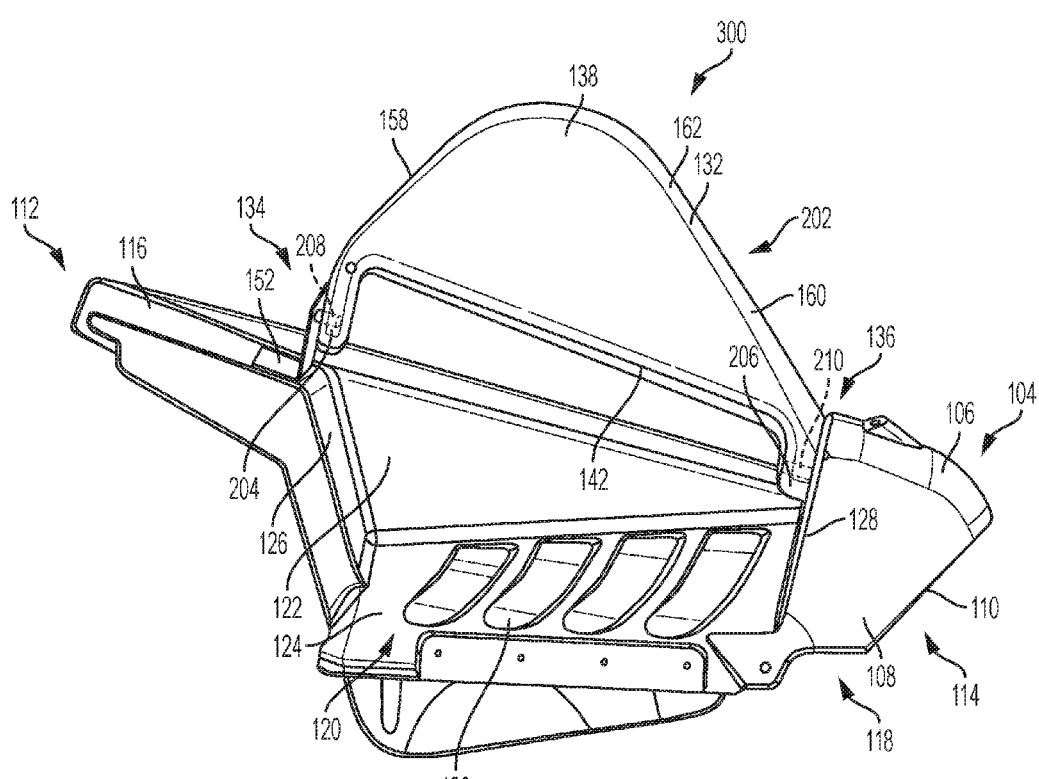
FIG. 15 is a side view of an exemplary divider of FIG. 14 including a non-detachable tall corn attachment in a working position.
Figure 16:
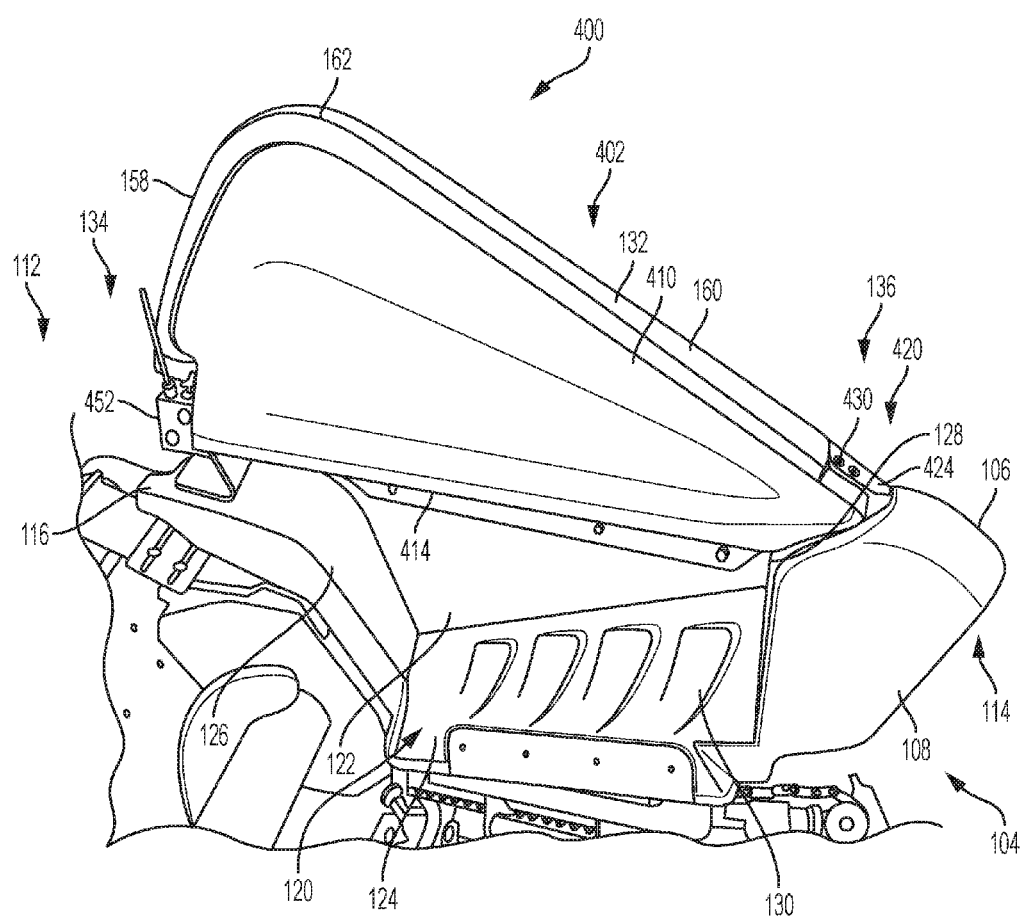
FIG. 16 is a left side view of an exemplary divider of the present disclosure including a detachable tall corn attachment in a working position.
Figure 17:
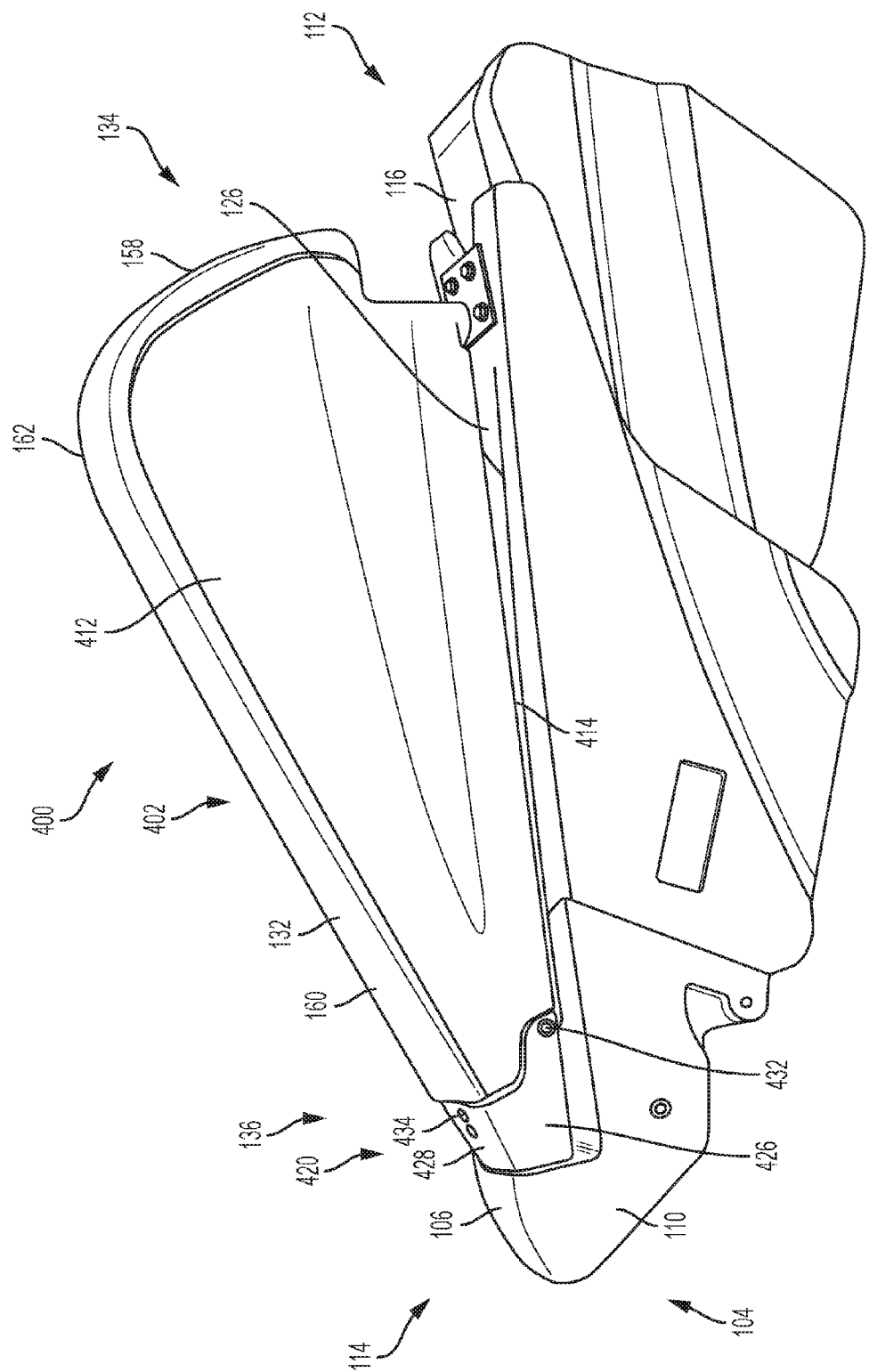
FIG. 17 is a right side view of an exemplary divider of FIG. 16 including a detachable tall corn attachment in a working position.

FIGS. 14 and 15 show an alternative embodiment of an exemplary divider 300 of the present disclosure. The divider 300 can be substantially similar in structure and function to the divider 100, 200, except for the distinctions noted herein. Therefore, like reference numbers are used to represent like structures. In particular, rather than including louvers 148, 150 formed in the first and second side surfaces 138, 140 of the tall corn attachment 202, the first and second side surfaces 148, 150 can define substantially planar surfaces. In addition, rather than including a slot 164, 166 extending through the entire tall corn attachment 202, a groove 302 can be formed in one or both of the first and second side surfaces 138, 140 that only partially extends into the surface of the tall corn attachment 202.

Figure 18:
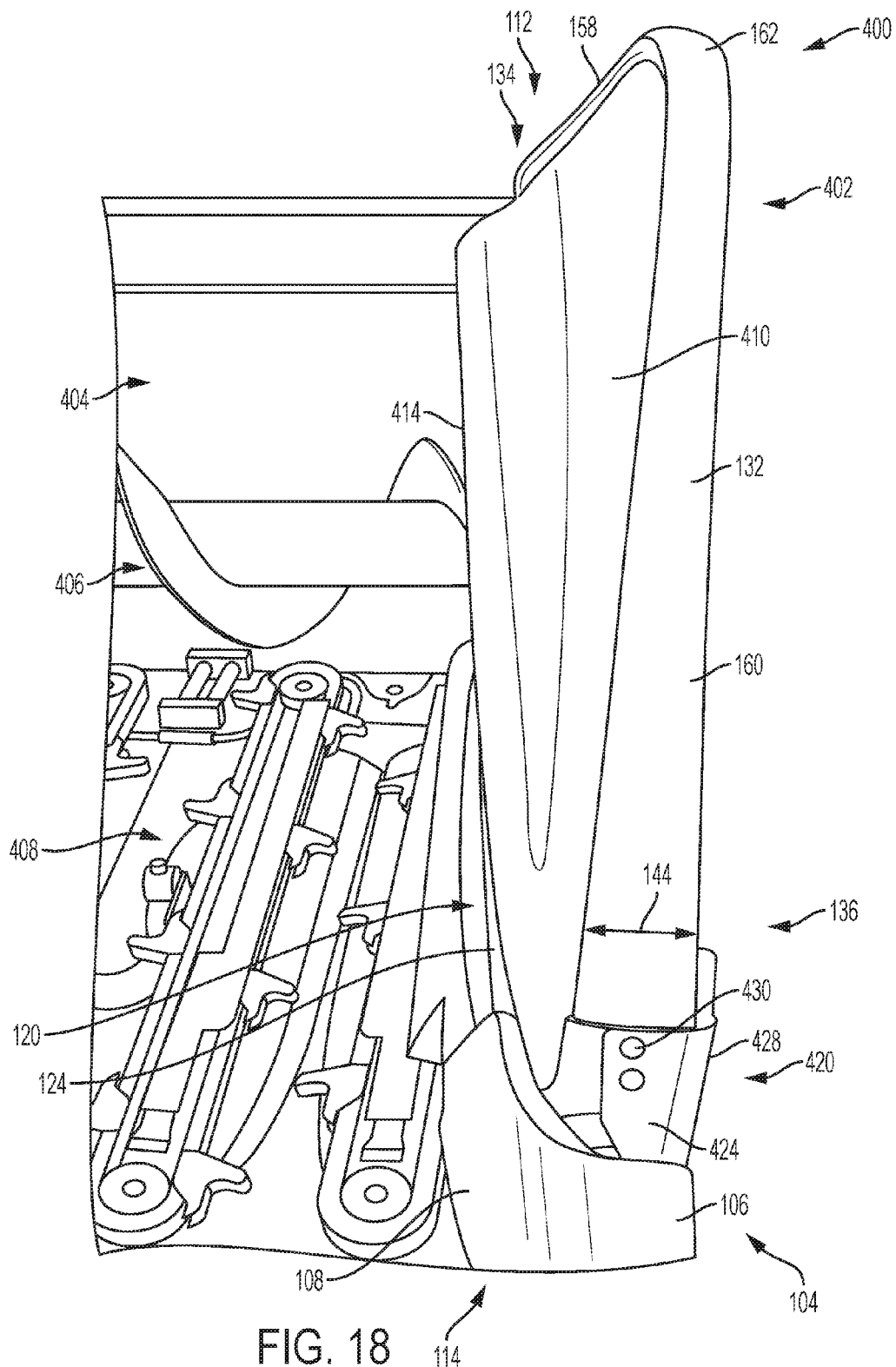
FIG. 18 is a front view of an exemplary divider of FIG. 16 including a detachable tall corn attachment in a working position, the divider being mounted to a corn head.
Figure 19:
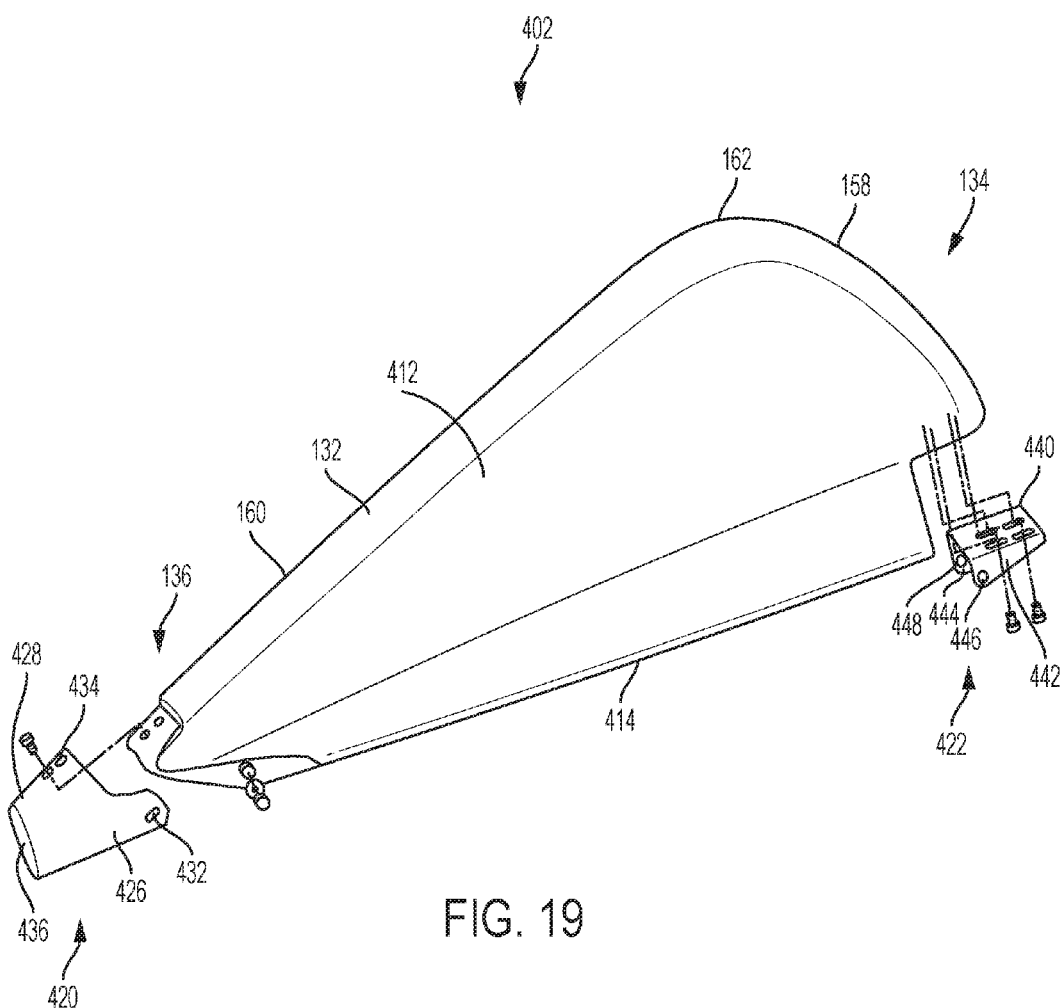
FIG. 19 is a right side, exploded view of an exemplary detachable tall corn attachment of FIG. 16.
Figure 20:
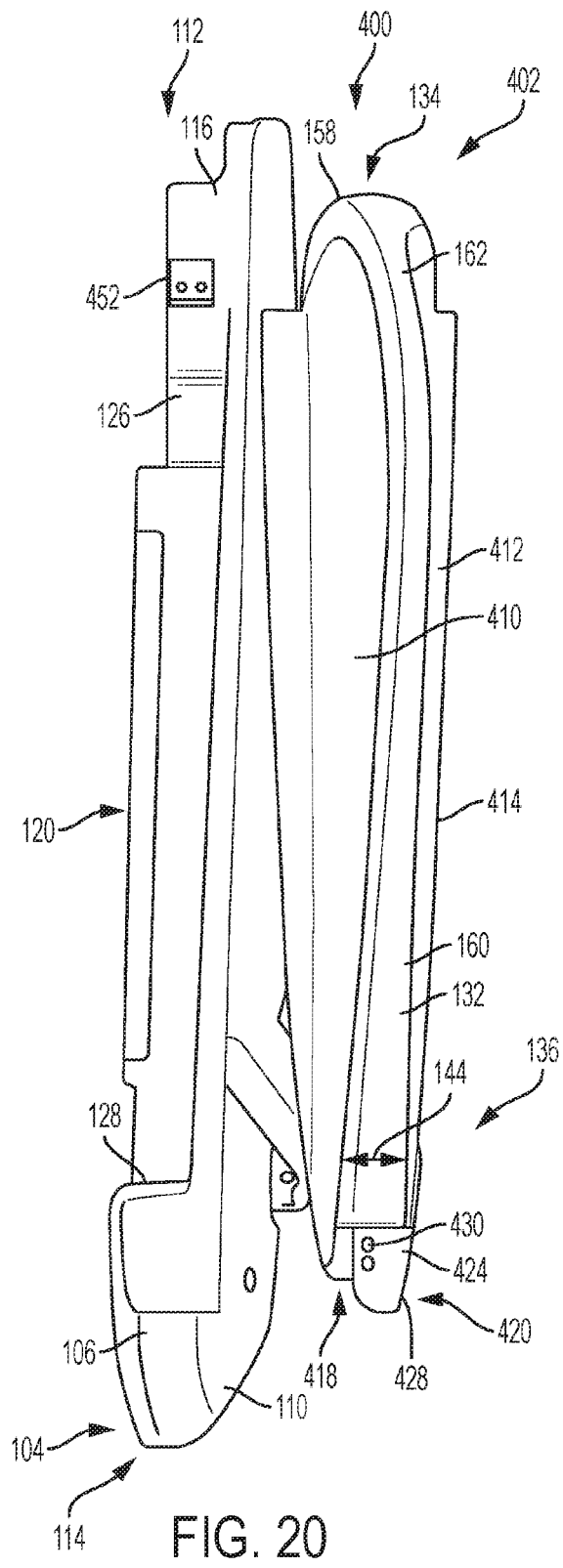
FIG. 20 is a top view of an exemplary divider of FIG. 16 including a detachable tall corn attachment in a disassembled arrangement.
Figure 21:
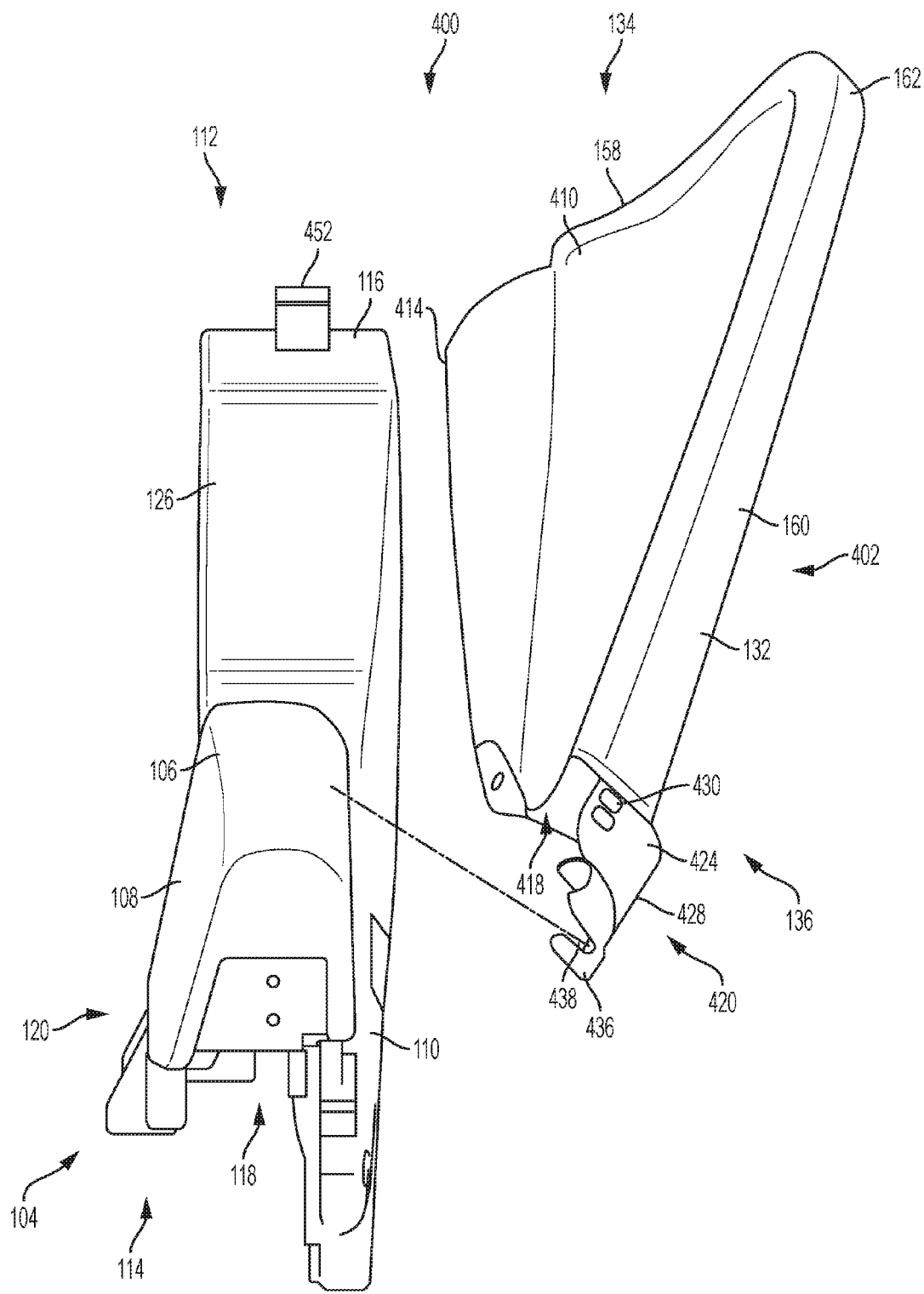
FIG. 21 is a front view of an exemplary divider of FIG. 16 including a detachable tall corn attachment in a disassembled arrangement.
Figures 22, 23:
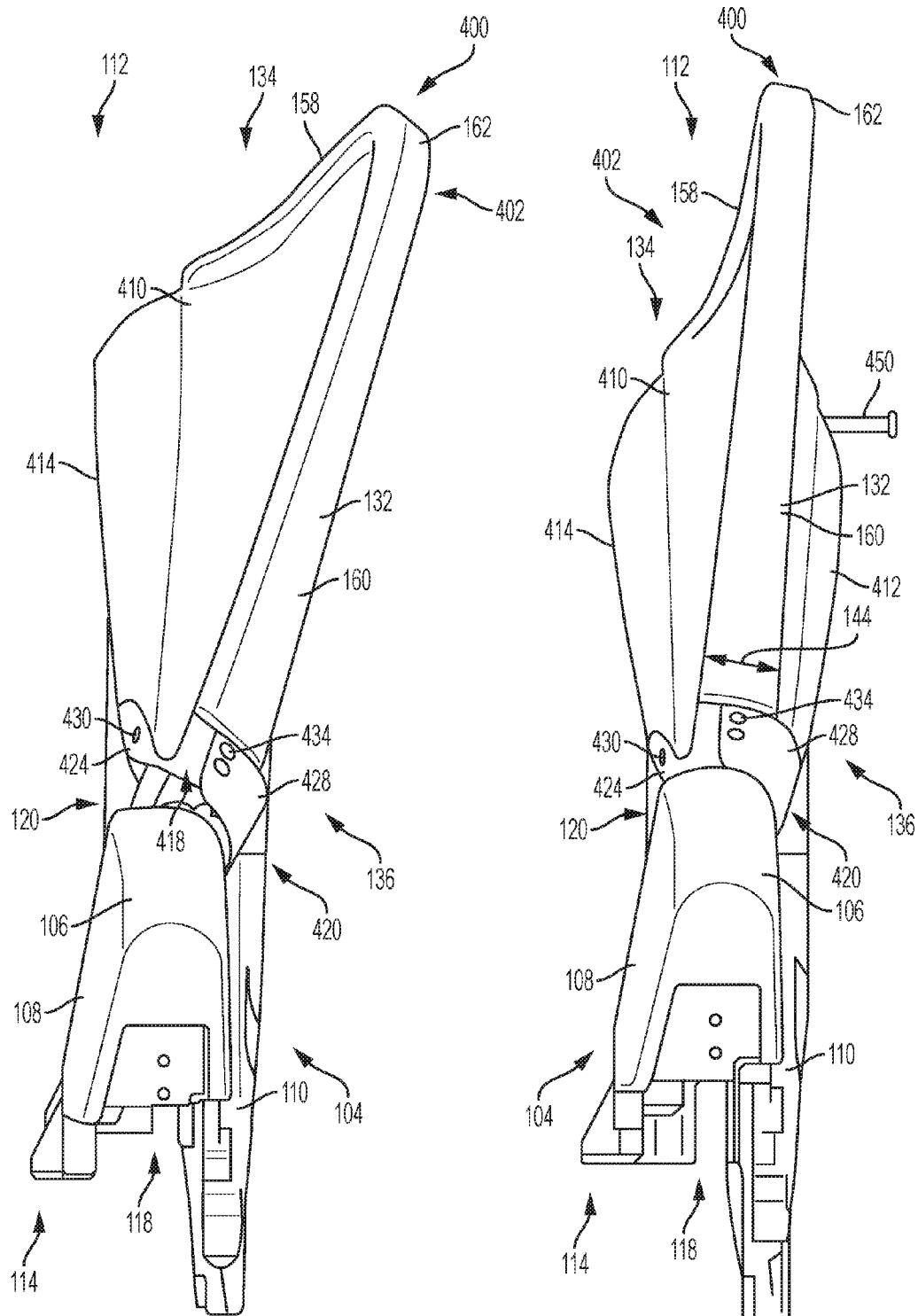
FIG. 22 is a front view of an exemplary divider of FIG. 16 including a detachable tall corn attachment in a disassembled arrangement.
FIG. 23 is a front view of an exemplary divider of FIG. 16 including a detachable tall corn attachment in an assembled arrangement.
Figure 24:
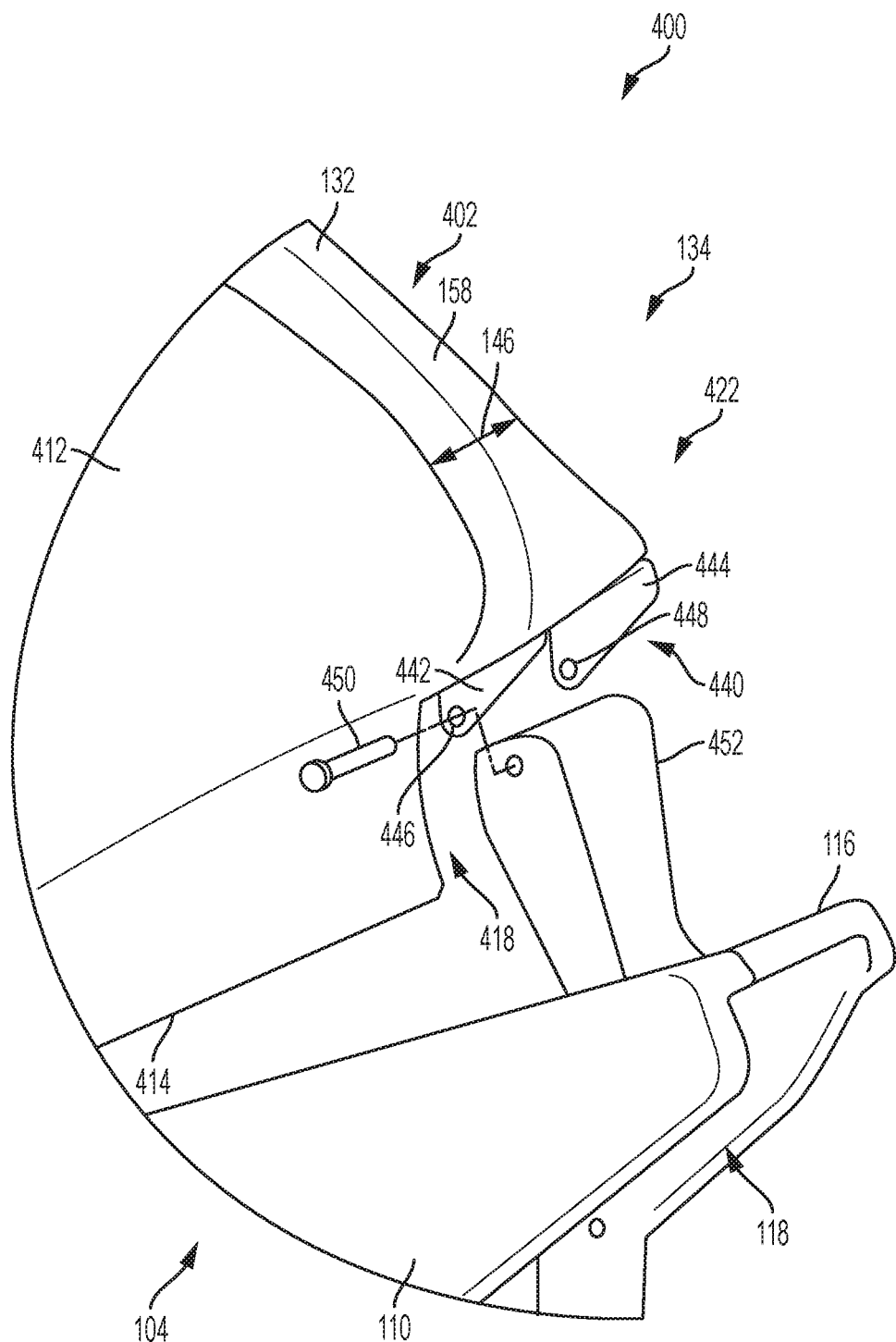
FIG. 24 is a detailed, rear view of an exemplary divider of FIG. 16 including a latching mechanism for mounting a detachable tall corn attachment to the divider.
Figure 25:
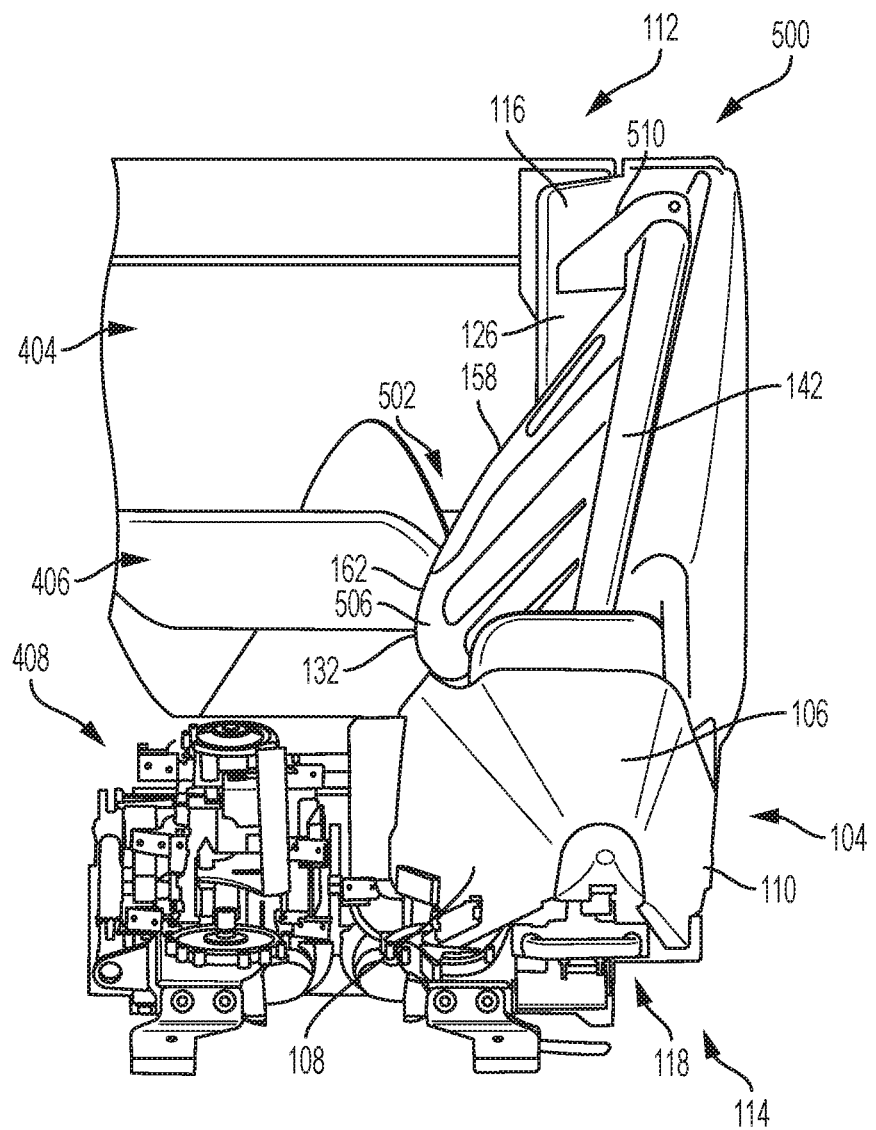
FIG. 25 is a front view of an exemplary divider of the present disclosure including a detachable tall corn attachment in a stored position.
Figure 26:
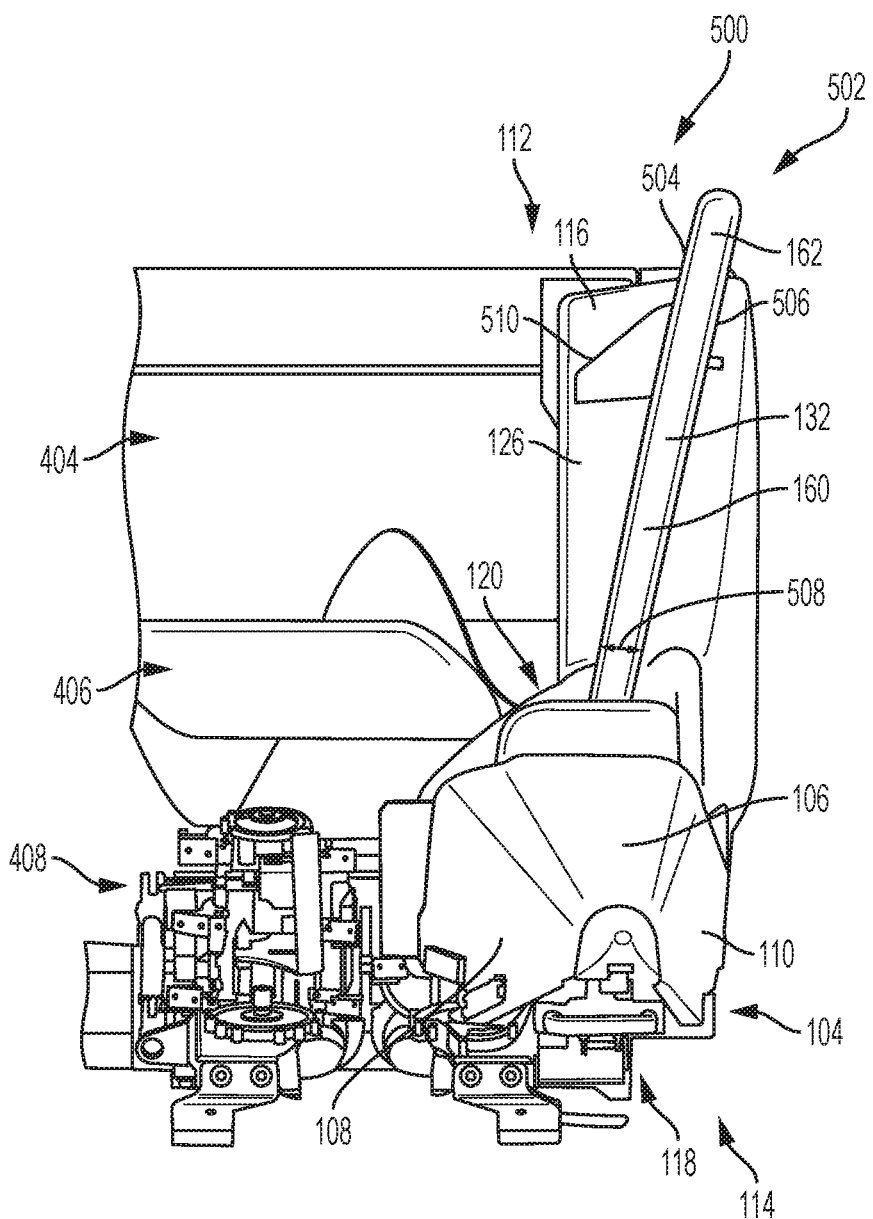
FIG. 26 is a front view of an exemplary divider of FIG. 25 including a detachable tall corn attachment in a working position.
Figure 27:
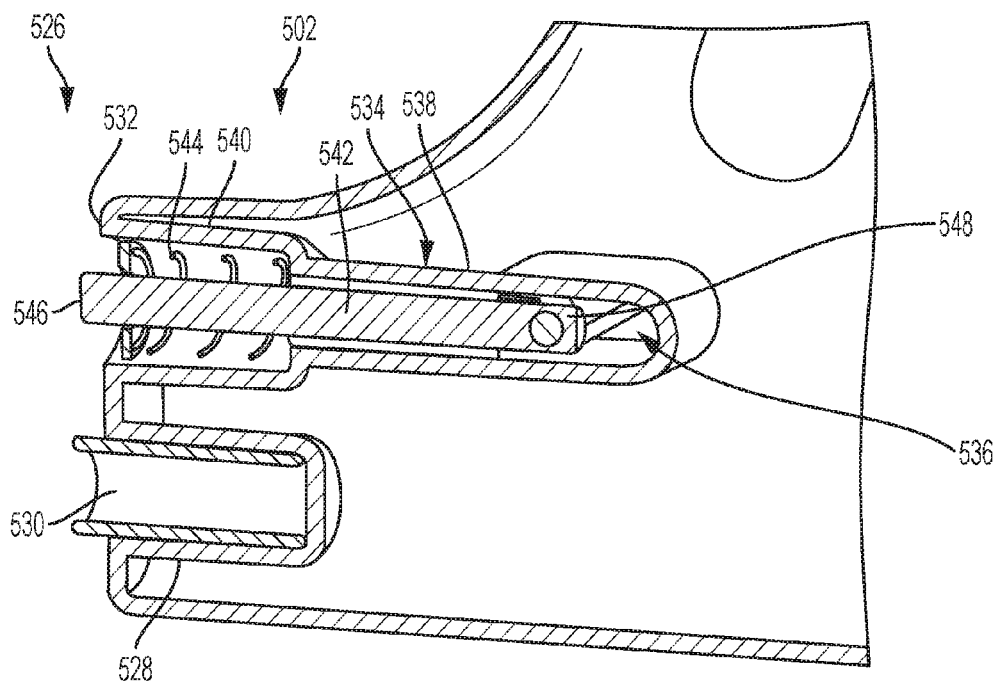
FIG. 27 is a detailed view of an exemplary latching mechanism of the divider of FIG. 25.
Figure 28:
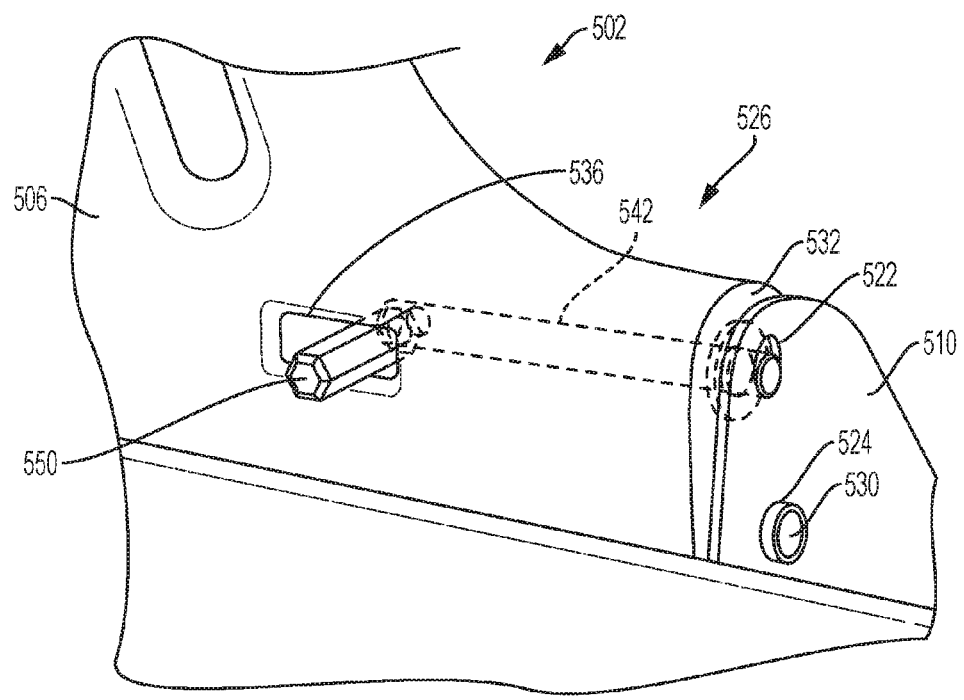
FIG. 28 is a detailed view of an exemplary latching mechanism of the divider of FIG. 25.
Figure 29:
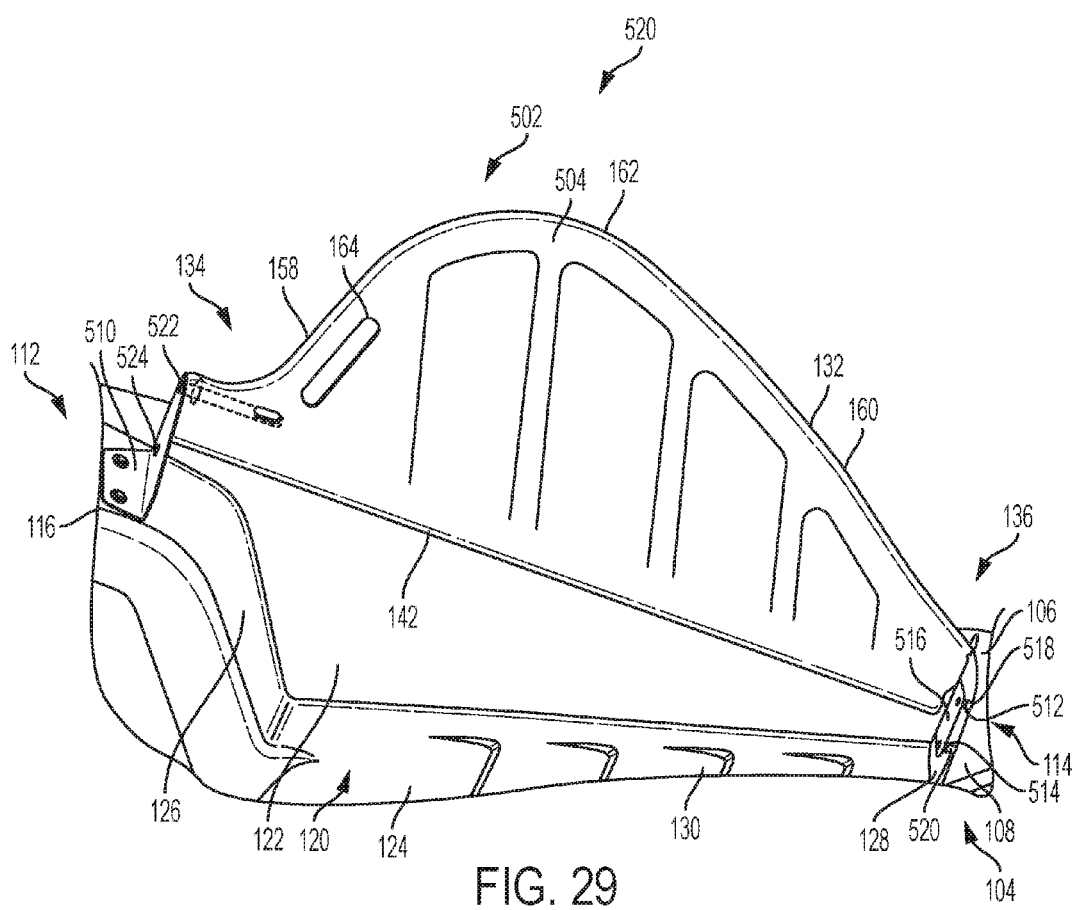
FIG. 29 is a side view of an exemplary divider of FIG. 25 including a detachable tall corn attachment in a working position.

FIGS. 16-24 show an alternative embodiment of an exemplary divider 400 of the present disclosure. The divider 400 can be substantially similar in structure and function to the divider 100, 200, 300 except for the distinctions noted herein. Therefore, like reference numbers are used to represent like structures. As shown in FIG. 18, the divider 400 can be operatively mounted to a corn head 404 including a transverse auger 406 and one or more collection mechanisms 408.

The leading edge 132 of the tall corn attachment 402 can be formed as a unitary structure with the first and second side walls 410, 412 or can be formed as a separate structure that is mounted over the top edge of the first and second side walls 410, 412. The first and second side walls 410, 412 can define smooth, curving surfaces that gradually transition from a narrow width at the leading edge 132 to a wide base 414. The distal width 144 of the leading edge 132 is dimensioned greater than the proximal width 146 and tapers or narrows in the direction of the proximal end 134. The wide leading edge 132 at the distal end 136 of the tall corn attachment 402 and the wide base 414 (relative to the leading edge 132) provides structural strength to the tall corn attachment 402 for guiding corn stalks engaged during harvesting. The bottom edges of the first and second side walls 410, 412 at the base 414 can be separated from each other to define an opening leading to a hollow interior 418. When assembled with the hood 104, a central longitudinal axis of the tall corn attachment 402 can be substantially aligned with the central longitudinal axis of the hood 104.

The tall corn attachment 402 includes a distal mounting bracket 420 and a proximal mounting bracket 422. The distal mounting bracket 420 can be bolted to the distal end 136 of the tall corn attachment 402, and the proximal mounting bracket 422 can be bolted to the proximal end 134 of the tall corn attachment 402 (e.g., a bottom edge of the proximal end 134). The distal mounting bracket 420 includes a substantially U-shaped configuration including first and second side walls 424, 426 connected at a rounded top wall 428. The first and second side walls 424, 426 include one or more apertures 430, 432 formed therein, and the top wall 428 includes one or more apertures 434, each aperture 430, 432, 434 configured for passage of a fastener for securing the distal mounting bracket 420 to the tall corn attachment 402. In some embodiments, the distal mounting bracket 420 can include a front wall 436 with a vertical slot 438 extending from the bottom surface. In such embodiments, the vertical slot 438 can be configured and dimensioned to fit over a fastener extending from the front planar wall 128 of the hood 104.

The proximal mounting bracket 422 defines a substantially U-shaped configuration with a central portion 440 and side walls 442, 444. The side walls 442, 444 can define a triangular or tapering configuration. Each of the side walls 442, 444 includes an aperture 446, 448 formed therein for passage of a pin 450 (e.g., a spring-loaded pin, a manually actuated pin, or the like). The proximal mounting bracket 422 can be secured to the proximal end 134 of the tall corn attachment 402, and the pin 450 can detachably interlock the proximal mounting bracket 422 to a complementary bracket 452 disposed on the hood 104. The tall corn attachment 402 can thereby be detachably mounted to the hood 104 at the proximal and distal ends 134, 136. Upon removal of the pin 450 from the proximal mounting bracket 422, the tall corn attachment 402 can be pivoted in an upward direction along the distal mounting bracket 420, and the distal mounting bracket 420 can be disengaged from the front planar wall 128 to detach the tall corn attachment 402 from the hood 104.

FIGS. 25-29 show front, detailed and side views of an alternative embodiment of an exemplary divider 500 of the present disclosure. The divider 500 can be substantially similar in structure and function to the divider 100, 200, 300, 400, except for the distinctions noted herein. Therefore, like reference numbers are used to represent like structures. In particular, the divider 500 includes a tall corn attachment 502 with first and second side walls 504, 506 that are substantially planar and extend define a substantially uniform width 508 from the leading edge 132 to the base 142.

In addition, the proximal and distal ends 134, 136 of the tall corn attachment 502 include a latching mechanism for detachably securing the tall corn attachment 502 to a proximal mounting bracket 510 and the front planar wall 128. The front planar wall 128 includes first and second apertures 512, 514 formed therein. The distal end 134 of the tall corn attachment includes a front wall 516 including two pins 518, 520 protruding therefrom. During assembly, the pins 518, 520 can be introduced into the apertures 512, 514 to create two pivot points that maintain the tall corn attachment 502 in the working position.

The proximal mounting bracket 510 includes two apertures 522, 524. The proximal end 134 includes a latching mechanism 526 including a first longitudinal passage 528 housing a first pin 530 extending therefrom. It should be understood that the latching mechanism 526 can be used in the alternative embodiments of the tall corn attachment described herein. The pin 530 protrudes from the rear surface 532 of the tall corn attachment 502. The latching mechanism 526 further includes a second longitudinal passage 534 formed in the rear surface 532 and extending parallel to the first longitudinal passage 528. The second longitudinal passage 534 communicates with a lateral passage 536 (e.g., an elongated slot) extending through the second side surface 506 to form a substantially right angle. The second longitudinal passage 534 includes a first portion 538 and a second portion 540. The first portion 538 defines a diameter dimensioned smaller than the second portion 540, and connects with the lateral passage 536.

The second longitudinal passage 534 receives therein an elongated pin 542 and a spring 544. The spring 544 is disposed within the second portion 540 of the second longitudinal passage 534 and maintains the pin 542 biased partially out of the rear surface 532 (e.g., the proximal end 546 extends out of the rear surface 532). The distal end 548 of the pin 542 is coupled to a lateral pin 550 that extends out of the lateral passage 536. The lateral pin 550 can travel within the elongated lateral passage 536 while simultaneously biasing the spring 544. In particular, sliding the lateral pin 550 in the distal direction biases the spring 544 to retract the proximal end 546 of the pin 542 into the second longitudinal passage 534. Releasing the lateral pin 550 allows the biasing force of the spring 544 to extend the proximal end 546 of the pin 542 out of the second longitudinal passage 534.

During assembly, after the pins 518, 520 at the distal end 136 have been engaged with the apertures 512, 514 of the front planar wall 128, the pin 530 can be inserted into the aperture 524 on the mounting bracket 510. Next, the spring-loaded pin 542 can be retracted, aligned with the aperture 522 of the mounting bracket 510, and released to engage the aperture 522. Thus, the tall corn attachment 502 can be detachably secured in the working position. To detach to tall corn attachment 502 from the hood 104, the pin 542 can be retracted into the second longitudinal passage 534, the proximal end 134 can be disengaged from the mounting bracket 510, and the distal end 136 can be disengaged from the front planar wall 128. The tall corn attachment 502 can further be received within the recessed area 120 in the stored position.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A corn harvester, comprising:
a corn head including a plurality of dividers, each divider including a hood with a top surface, first and second side surfaces, a proximal end and a distal end, one of the first or second side surfaces including a recessed area formed therein, each hood comprising a central longitudinal axis; and
a tall corn attachment mounted to the hood and comprising a bottom surface, the tall corn attachment configured to pivot along a pivot axis extending substantially parallel to the bottom surface of the tall corn attachment and substantially aligned with the central longitudinal axis of the hood to be positioned in a stored position or a working position, wherein in the stored position the tall corn attachment is received within the recessed area of the hood, and wherein in the working position the tall corn attachment extends from the top surface of the hood;
wherein the tall corn attachment includes a latching mechanism for locking the tall corn attachment in the stored position or the working position.

2. The corn harvester of claim 1, wherein the recessed area of the hood is complementary to the configuration of the tall corn attachment.

3. The corn harvester of claim 1, wherein the recessed area of the hood includes a planar side wall offset from the central longitudinal axis of the hood and extending between the proximal and distal ends of the hood, and a front planar wall located near the distal end of the hood.

4. The corn harvester of claim 3, wherein in the working position, the tall corn attachment is aligned with the central longitudinal axis of the hood.

5. The corn harvester of claim 3, comprising a support flange mounted on the hood and located near the proximal end of the hood, the support flange including an aperture formed therein.

6. The corn harvester of claim 5, wherein the latching mechanism comprises a pivot pin extending from a distal end of the tall corn attachment and a pin extending from a proximal end of the tall corn attachment.

7. The corn harvester of claim 6, wherein the pivot pin extending from the distal end of the tall corn attachment is configured to be received in an aperture formed in the front planar wall of the recessed area of the hood to define a distal pivot point, and the pin extending from the proximal end of the tall corn attachment is configured to be received in the aperture of the support flange to define a proximal pivot point, the distal and proximal pivot points extending along the pivot axis.

8. The corn harvester of claim 1, wherein the tall corn attachment is detachably mounted to the hood.

9. The corn harvester of claim 1, wherein the tall corn attachment includes a leading edge extending between a proximal end and a distal end of the tall corn attachment, a base, and first and second side surfaces.

10. The corn harvester of claim 9, wherein the leading edge defines a curved surface tapering from a first width at the distal end to a second width at the proximal end, the first width being dimensioned greater than the second width.

11. The corn harvester of claim 9, wherein each of the first and second side surfaces tapers outwardly from the leading edge to the base.

12. The corn harvester of claim 9, wherein each of the first and second side surfaces includes one or more indented louvers formed therein.

13. The corn harvester of claim 5, wherein a proximal end of the tall corn attachment is rotatably mounted to the support flange of the hood in a non-detachable manner, and the distal end of the tall corn attachment is rotatably mounted to the front planar wall of the recessed area of the hood in a non-detachable manner.

14. The corn harvester of claim 1, wherein the pivot axis of the tall corn attachment is offset from the bottom surface of the tall corn attachment, and the tall corn attachment further comprises a proximal leading edge portion and a distal leading edge portion connected by a rounded leading edge top portion.

15. The corn harvester of claim 14, wherein the proximal leading edge portion and the distal leading edge portion extend at angles relative to the pivot axis, the angle of the proximal leading edge portion being greater than the angle of the distal leading edge portion.

16. The corn harvester of claim 14, wherein the tall corn attachment includes a groove formed offset from and extending parallel to the proximal leading edge, the groove being configured and dimensioned to receive at least a portion of a hand of a user.

17. A corn harvester divider, comprising:
a hood with a central longitudinal axis, a top surface, first and second side surfaces, a proximal end and a distal end, one of the first or second side surfaces including a recessed area formed therein; and
a tall corn attachment mounted to the hood and comprising a bottom surface, the tall corn attachment configured to pivot along a pivot axis extending substantially parallel to the bottom surface of the tall corn attachment and substantially aligned with the central longitudinal axis of the hood to be positioned in a stored position or a working position, wherein in the stored position the tall corn attachment is received within the recessed area of the hood, and wherein in the working position the tall corn attachment extends from the top surface of the hood;
wherein the tall corn attachment includes a latching mechanism for locking the tall corn attachment in the stored position or the working position.

18. A method of operating a corn harvester, comprising:
providing a corn head including a plurality of dividers, each divider including a hood with a top surface, first and second side surfaces, a proximal end and a distal end, one of the first or second side surfaces including a recessed area formed therein, each hood comprising a central longitudinal axis;
mounting a tall corn attachment to the hood, the tall corn attachment comprising a bottom surface;
rotating the tall corn attachment about a pivot axis extending substantially parallel to the bottom surface of the tall corn attachment and substantially aligned with the central longitudinal axis of the hood to position the tall corn attachment in a stored position, wherein in the stored position the tall corn attachment is received within the recessed area of the hood; and
rotating the tall corn attachment about the pivot axis to position the tall corn attachment in a working position, wherein in the working position the tall corn attachment extends from the top surface of the hood;
wherein the tall corn attachment includes a latching mechanism for locking the tall corn attachment in the stored position or the working position.

19. The method of claim 18, comprising detaching the tall corn attachment from the hood prior to positioning the tall corn attachment in the stored position.

20. The method of claim 18, comprising rotating the tall corn attachment between the working position and the stored position along the pivot axis in a non-detachable manner relative to the hood.

* * * * *